United States Patent
Liu et al.

(10) Patent No.: US 11,720,060 B2
(45) Date of Patent: Aug. 8, 2023

(54) SINGLE-SHOT FRESNEL NON-COHERENT CORRELATION DIGITAL HOLOGRAPHIC DEVICE BASED ON POLARIZATION-ORIENTED PLANAR LENS

(71) Applicant: Shanghai Institute of Optics And Fine Mechanics, Chinese Academy of Sciences, Shanghai (CN)

(72) Inventors: Jun Liu, Shanghai (CN); Dong Liang, Shanghai (CN); Qiu Zhang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 257 days.

(21) Appl. No.: 17/171,561

(22) Filed: Feb. 9, 2021

(65) Prior Publication Data

US 2021/0181675 A1    Jun. 17, 2021

Related U.S. Application Data

(63) Continuation of application No. PCT/CN2019/084899, filed on Apr. 29, 2019.

(30) Foreign Application Priority Data

Aug. 13, 2018 (CN) .......................... 201810916579.4

(51) Int. Cl.
| | | |
|---|---|---|
| *G03H 1/04* | (2006.01) | |
| *G03H 1/06* | (2006.01) | |
| *G03H 1/22* | (2006.01) | |

(52) U.S. Cl.
CPC ............ *G03H 1/0443* (2013.01); *G03H 1/06* (2013.01); *G03H 2001/2265* (2013.01); *G03H 2222/31* (2013.01); *G03H 2223/20* (2013.01)

(58) Field of Classification Search
CPC ............ G03H 1/06; G03H 2001/2265; G03H 2222/31; G03H 2223/20; G03H 1/0866;
(Continued)

(56) References Cited

U.S. PATENT DOCUMENTS

| | | | |
|---|---|---|---|
| 7,106,456 B1* | 9/2006 | Cottrell | G01M 11/005 356/521 |
| 2017/0052508 A1* | 2/2017 | Brooker | G02B 5/3083 |

FOREIGN PATENT DOCUMENTS

| | | |
|---|---|---|
| CN | 103257441 A | 8/2013 |
| CN | 104793475 A | 7/2015 |
| CN | 108459485 A | 8/2018 |

* cited by examiner

*Primary Examiner* — Audrey Y Chang
(74) *Attorney, Agent, or Firm* — Mei & Mark LLP; Manni Li

(57) ABSTRACT

A single-shot Fresnel non-coherent correlation digital holographic device based on a polarization-oriented planar lens, comprising: A polarization-oriented planar lens (1) for wavefront modulation and beam splitting, a focusing element (2), a half-wave plate (3) with a small hole and a polarization imaging camera (4). Incident light passes through the polarization-oriented planar lens (1) and the focusing element (2) and is divided into two beams with different polarizations, that is, focused and parallel or focused and divergent beams, wherein the focused beam passes through the small hole of the half-wave plate (3), the parallel or divergent beam passes through the half-wave plate (3), so as to make the polarization of the two beams consistent behind pass through the half-wave plate (3).

4 Claims, 2 Drawing Sheets

(58) Field of Classification Search
CPC . G03H 2001/0447; G02B 3/10; G02B 5/3016
USPC .................... 356/521, 495, 450, 457; 359/30
See application file for complete search history.

SINGLE-SHOT FRESNEL NON-COHERENT CORRELATION DIGITAL HOLOGRAPHIC DEVICE BASED ON POLARIZATION-ORIENTED PLANAR LENS

CROSS-REFERENCE TO RELATED APPLICATIONS

The subject application is a continuation of PCT/CN2019/084899 filed on Apr. 29, 2019, which claims priority on Chinese Application No. CN201810916579.4 filed on Aug. 13, 2018 in China. The contents and subject matter of the PCT international application and Chinese priority application are incorporated herein by reference.

TECHNICAL FIELD

The present invention relates to incoherent digital holographic single-shot measurement techniques, which have promising applications in a number of related fields such as digital holography, three-dimensional imaging, surface morphometry, and fluorescence microscopy imaging.

BACKGROUND OF THE TECHNOLOGY

Non-coherent digital holography frees traditional digital holography from the dependence on coherent light sources and extends the application of holography to the field of non-coherent imaging, thus allowing the application fields of fluorescent 3D microscopic imaging, color holography, and adaptive optics.

Incoherent holography uses an optical technique to divide light waves originating from the same point on a spatially incoherent object into two beams and uses the spatial self-coherence of these two beams to achieve the recording of a point-source hologram, and the incoherent superposition of all point-source holograms constitutes the hologram of the object. Recording holograms using image acquisition equipment and numerically reproducing them in a computer can recover the 3D position information of the original object. The more commonly used spectroscopic devices are spatial light modulators, birefringent crystal lenses, and liquid crystal gradient refractive index lenses, etc. However, these devices such as spatial light modulators, have high performance requirements and require software adjustment and control, which is more complicated; and Birefringent lenses have high cost and material requirements, and it's not easy to process and customize.

Polarization-oriented planar lens are flat lenses formed with polymerized liquid crystal thin-films that create a focal length that is dependent on polarization state. These unique lenses have either a positive or negative focal length depending on the phase of the input polarization. With right-handed circularly polarized light, the lenses produce one focal length, while left-handed circularly polarized light presents a focal length with the opposite sign. Unpolarized light produces a positive and negative focal length at the same time. Both output waves are circularly polarized and orthogonal to each other. The feature can fully realize the beam splitting effect of the beam splitting device. Compared with conventional lenses, polarization-oriented planar lens have high transmittance in the visible and infrared light bands with less loss, and their thickness is less than 1 mm, which can be used as an ideal thin lens that can eliminate spherical aberration for applications in AR, cameras, astronomy, satellites, and security, etc.

Compared with spatial light modulators and other beam splitting devices, polarization-oriented planar lens can perfectly realize the functions of wavefront modulation and beam splitting and have many advantages such as simple operation, easy adjustment, and low cost, which are extremely suitable for incoherent digital holography.

In incoherent digital holography, the resulting holographic interference pattern inevitably contains a DC term and a conjugate term, which interferes with the imaging quality of the original image during the numerical reconstruction process. The most widely used method at present is the multi-step phase shift method eliminates the influence of the DC term and the conjugate term by loading different phase values in the optical path. However, the multi-step phase shift method usually requires multiple data acquisitions. Thus, it cannot acquire holographic interferograms of dynamic objects and has great limitations in microscopic imaging.

SUMMARY OF INVENTION

In the device of the present invention, the parallel phase shift method is used to simultaneously acquire holographic interferograms with four different phase values by the micro-polarization array in the polarization camera, which can realize the single-shot measurement of the target object.

The present invention provides a single-shot Fresnel non-coherent correlation digital holographic device based on a polarization-oriented planar lens, which utilizes the modulation and beam splitting characteristics of the polarization-oriented planar lens and the function that the polarization camera can simultaneously acquire holographic interferograms with different phase values to achieve single-shot imaging of the target object, and has the advantages of being compact in structure, economical and practical, convenient to construct and easy to modulate.

The present invention provides a single-shot Fresnel non-coherent correlation digital holographic device based on a polarization-oriented planar lens which comprises a polarization-oriented planar lens, a focusing element, a half-wave plate with a small hole and a polarization imaging camera. The incoherent light emitted from the target object is modulated and divided by polarization-oriented planar lens and then emitted as focused and divergent beams, that is, the first left-handed circularly polarized light and the first right-handed circularly polarized light. The first left-handed circularly polarized light and the first right-handed circularly polarized light are converged by the second focusing element to obtain the second left-handed circularly polarized light and the second right-handed circularly polarized light. The second left-handed circularly polarized light converges through the small hole of the half-wave plate without changing the direction of rotation to obtain the third left-handed circularly polarized light. The second right-handed circularly polarized light passes parallel to the half-wave plate with a small hole and changes its rotation to obtain the fourth left-handed circularly polarized light. The third left-handed circularly polarized light and the fourth left-handed circularly polarized light overlap in the polarization camera to collect the interferogram with four different phase values of the object information at the same time. The information of the original object can be recovered by numerically reproducing it in a computer using the phase shift method, thus realizing a single-shot Fresnel incoherent correlated digital holographic device based on a polarization-oriented planar lens.

The present invention uses a polarization-oriented planar lens, avoiding the tedious adjustment process of spatial light modulators, to make the device convenient to construct and easy to modulate, and significantly reduces its cost.

The present invention uses a half-wave plate with a small hole to change the rotation of the right-handed circularly polarized light, so that the rotation of the two beams of circularly polarized light to interfere with the same direction and reduce the loss of light intensity caused by the use of line polarizers.

The present invention uses the micro-polarization array in the polarization camera can simultaneously acquire holographic interferograms with four different phase values. It achieves single-shot measurement of the imaged object using the parallel phase shift method, overcoming the limitation that the multi-step phase shift method cannot measure dynamic objects, and allowing for single-shot and dynamic object imaging.

BRIEF DESCRIPTION OF THE DRAWINGS

FIG. 3A shows the recorded single-shot raw hologram, FIGS. 3B, 3C, 3D, and 3E show four phase-shifting holograms, FIGS. 3F and 3G show complex hologram amplitude and phase, and FIG. 3H shows reconstructed target image.

DETAILED DESCRIPTION OF INVENTION

The present invention is further described in detail below with reference to the drawings and embodiments, but it should not be used to limit the scope of protection of the present invention.

Figure 1:
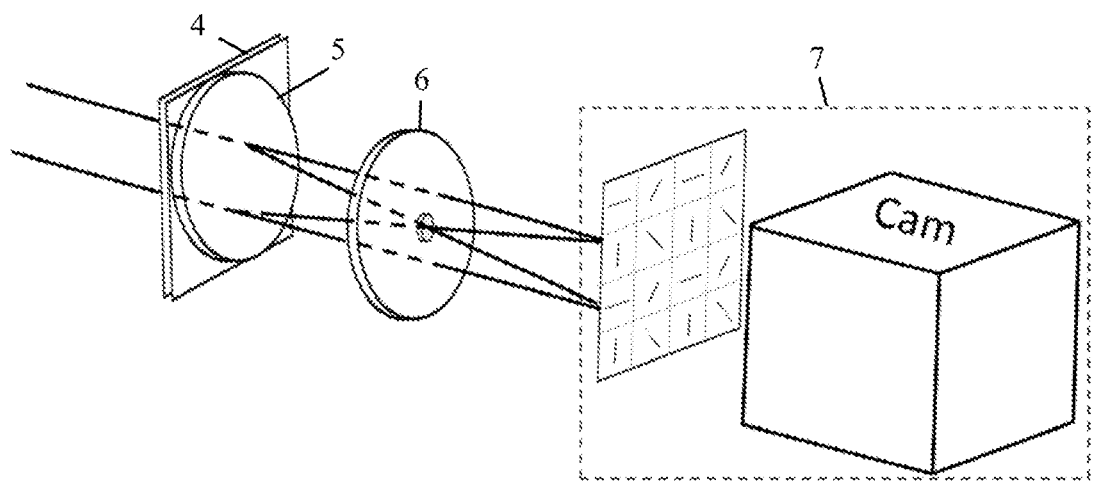
FIG. 1 shows the optical path of the single-shot Fresnel non-coherent correlation digital holographic device based on a polarization-oriented planar lens in the present invention.
Figure 2:
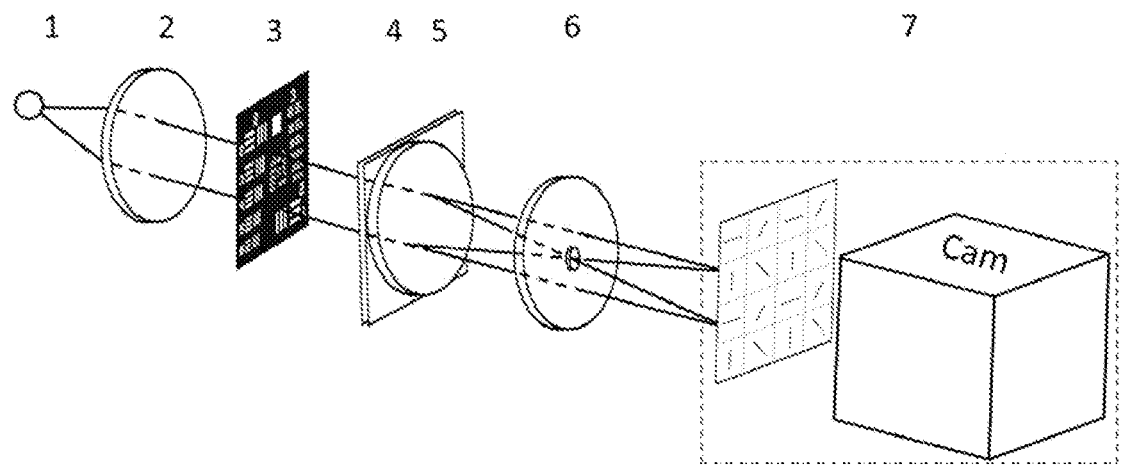
FIG. 2 shows the optical path of an embodiment of the present invention.
Figure 3A:
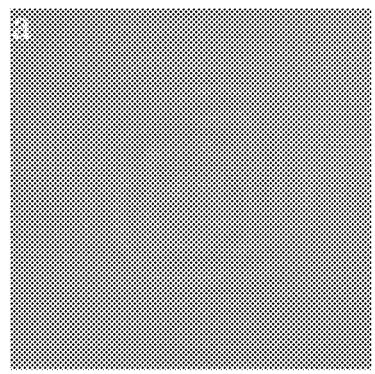
FIGS. 3A to 3H show recorded and reconstructed images of a transmission test target which are measured by the device of the present invention, where
Figure 3B:
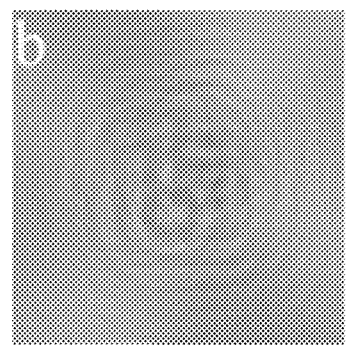
Figure 3C:
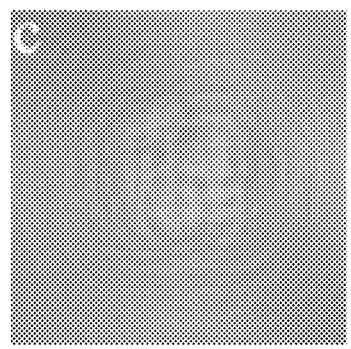
Figure 3D:
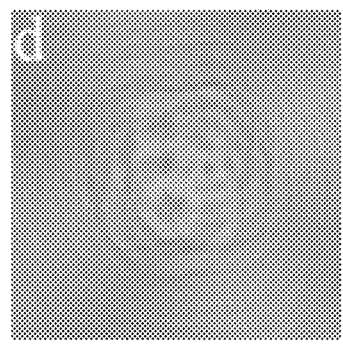
Figure 3E:
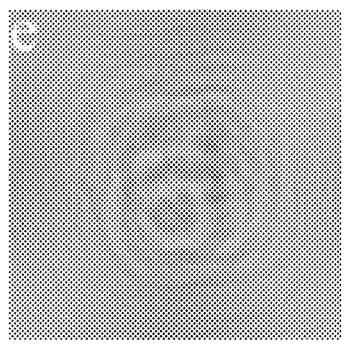
Figure 3F:
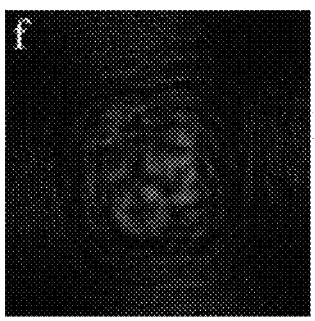
Figure 3G:
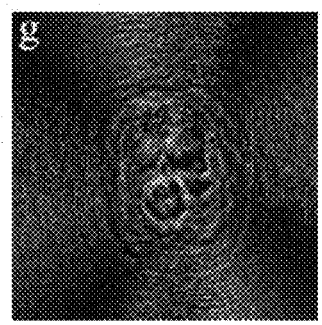
Figure 3H:
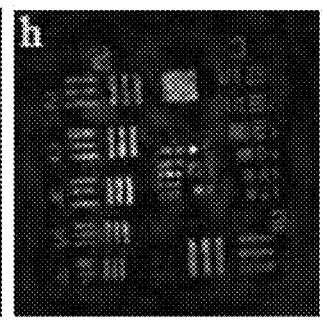

As shown in FIG. 2, in one embodiment of single-shot Fresnel non-coherent correlation digital holographic device based on a polarization-oriented planar lens of the present invention, the device comprises an incoherent light source 1, the optical path direction of the incoherent light emitted from the incoherent light source is sequentially equipped with the first focusing element 2, an imaging object 3, a polarization-oriented planar lens 4, the second focusing element 5, a half-wave plate 6 with a small hole, and a polarization imaging camera 7;

The first achromatic lens with a focal length of 75 mm collimates the incoherent light emitted from a non-coherent light source, central wavelength of 530 nm and bandwidth of 30 nm, as parallel light through the imaging object 1951USAF resolution test target. Then it enters the polarization-oriented planar lens with a focal length of 100 mm, and obtains the converged the first left-handed circularly polarized light and the diverging first right-handed circularly polarized light, respectively. The first left-handed circularly polarized light and the first right-handed circularly polarized light pass through the second achromatic lens with a focal length of 100 mm to obtain converged the second left-handed circularly polarized light and the second right-handed circularly polarized light, wherein the polarization-oriented planar lens and the second achromatic lens are separated by 0 mm. The second left-handed circularly polarized light whose focus is exactly through the half-wave plate with a small hole and does not change the rotation direction and obtains the third left-handed circularly polarized light. The half-wave plate with a small hole changes the direction of the incident the second right-hand circularly polarized light to obtain the fourth left-hand circularly polarized light. The center wavelength of the half-wave plate with a small hole is 530 nm, and the diameter of the center hole is 1 mm. The overlapping interference of the third left-handed circularly polarized light and the fourth left-handed circularly polarized light in the polarization camera can simultaneously collect interferograms with object information of different phase values. Its numerical reproduction in a computer using the phase shift method can recover the information of the original object, as shown in FIGS. 3A to 3H. Thus, a single-shot Fresnel non-coherent correlation digital holographic device based on a polarization-oriented planar lens is realized.

The holographic device of the present invention performs wavefront modulation and beam splitting by using the characteristics of the polarization-oriented planar lens sensitive to circularly polarized light, implements single-shot measurement of an imaging object by using a micro-polarization array in the polarization imaging camera, and has the advantages of being compact in structure, economical and practical, convenient to construct and easy to modulate.

We claim:

1. A holographic device, comprising
a polarization-oriented planar lens,
a focusing element, the focusing element being attached to the polarization-oriented planar lens with a separation distance of 0 mm and comprising a focal point,
a half-wave plate with a small hole, wherein the focal point of the focusing element is in the small hole of the half-wave plate, and
a polarization imaging camera,
wherein an incident light passes through the polarization-oriented planar lens and the focusing element, and is divided into a left-handed circularly polarized light and a right-handed circularly polarized light with different polarization, and one of the left-handed circularly polarized light and the right-handed circularly polarized light is a focused beam, and the other of the left-handed circularly polarized light and right-handed circularly polarized light is a parallel or divergent beam,
the focused beam passes through the small hole of the half-wave plate,
the parallel or divergent beam passes through the half-wave plate, wherein polarization of the parallel or divergent beam is changed to be consistent with the polarization of the focused beam so that both become left-handed or right-handed circularly polarized beams and are overlapped in the polarization imaging camera to obtain an interferometric pattern of recorded object information.

2. The holographic device according to claim 1, wherein the polarization-oriented planar lens performs wavefront modulation and beam splitting function.

3. The holographic device according to claim 1, wherein the half-wave plate with the small hole has an effect of changing rotation direction of the circularly polarized light and reducing a light intensity loss.

4. The holographic device according to claim 1, wherein the polarization imaging camera comprises a micro-polarization array, and the micro-polarization array simultaneously acquires holographic interferograms with different phase values, and obtains single-shot measurements of an imaged object by parallel phase shift.

* * * * *